INVENTOR.
Warren D. Novak
BY
Wood, Herron & Evans
ATTORNEYS

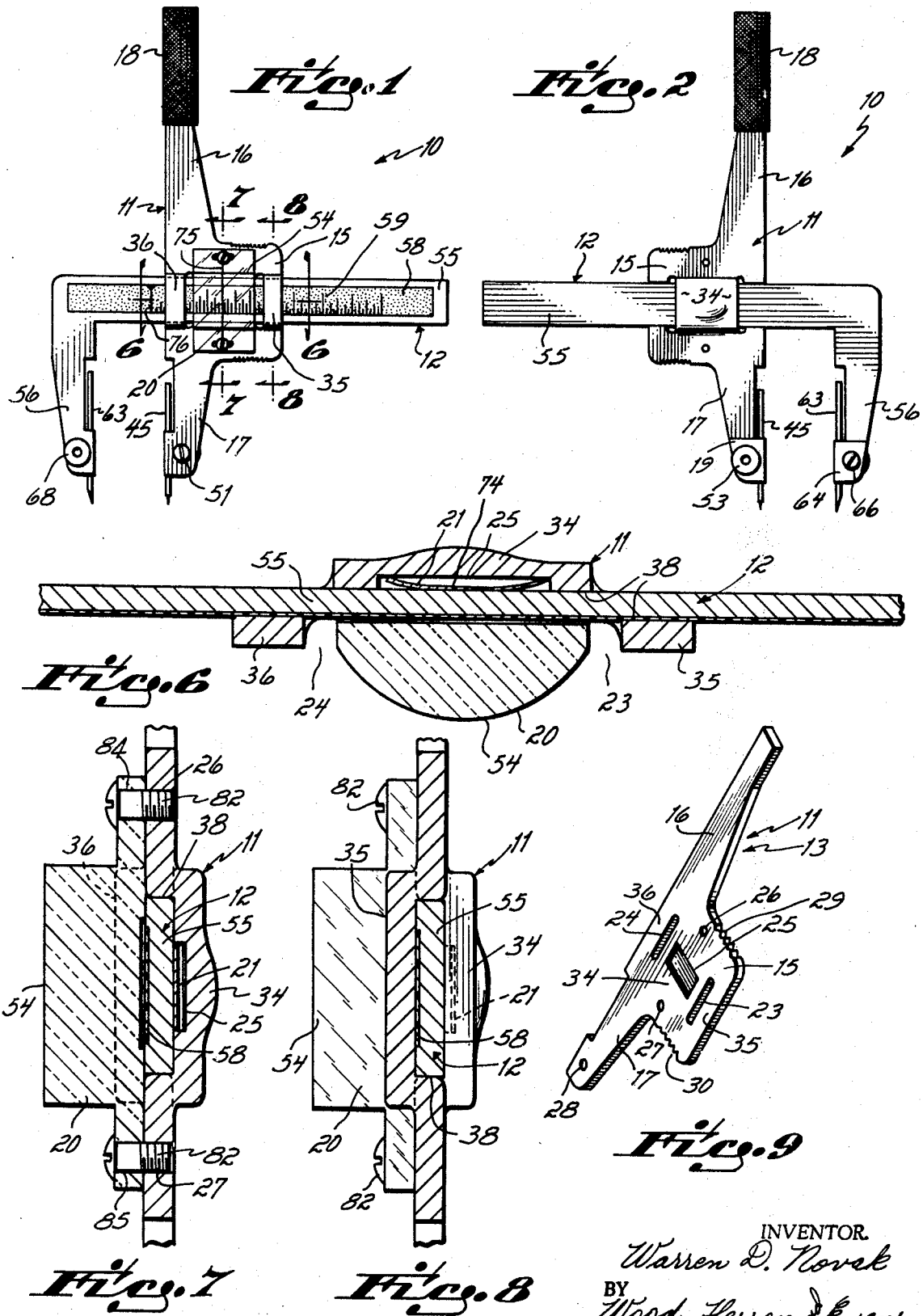

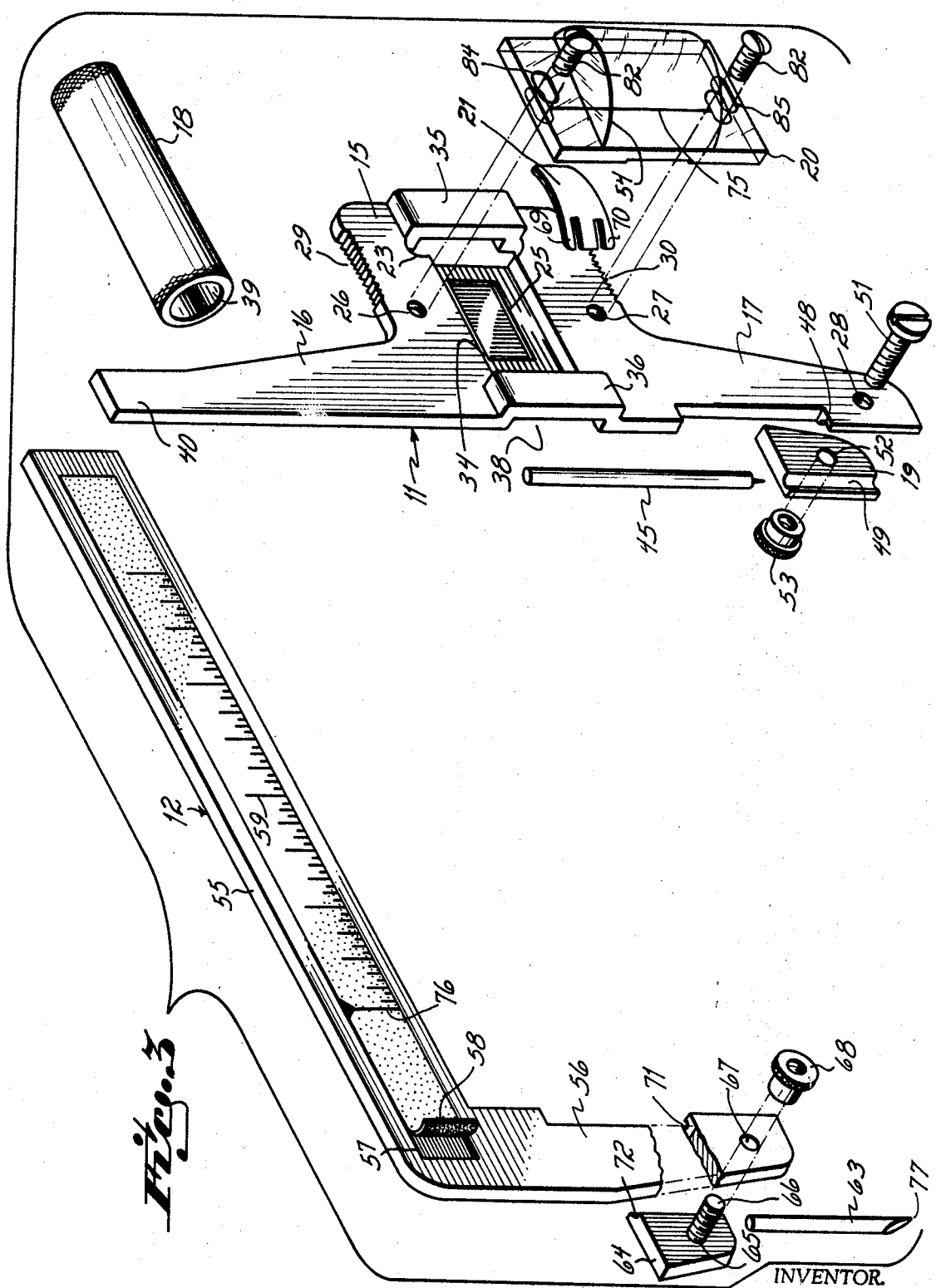

United States Patent Office 3,524,258
Patented Aug. 18, 1970

3,524,258
SLIDE COMPASS
Warren D. Novak, 325 Douglas Road,
Chappaqua, N.Y. 10514
Filed Aug. 29, 1968, Ser. No. 756,233
Int. Cl. B43l 9/04
U.S. Cl. 33—27                                    7 Claims

ABSTRACT OF THE DISCLOSURE

A direct reading slide compass for effecting precise relative displacement between two pointed elements of a compass. One element comprises a body having a generally flat central section from which a needle foot depends downwardly and a rotation post extends upwardly. The central section of the body has a pair of transversely spaced vertical slots between which the body is offset in one direction and outside of which the body is offset in the opposite direction so as to define a transverse slideway therebetween. A flat slide having a flat marking foot depending from one end is slidable within the transverse slideway. There is an indicia bearing scale secured to the slide and a hairline index mark secured to the body to facilitate precise adjustment of the slide relative to the body.

Figure 4:
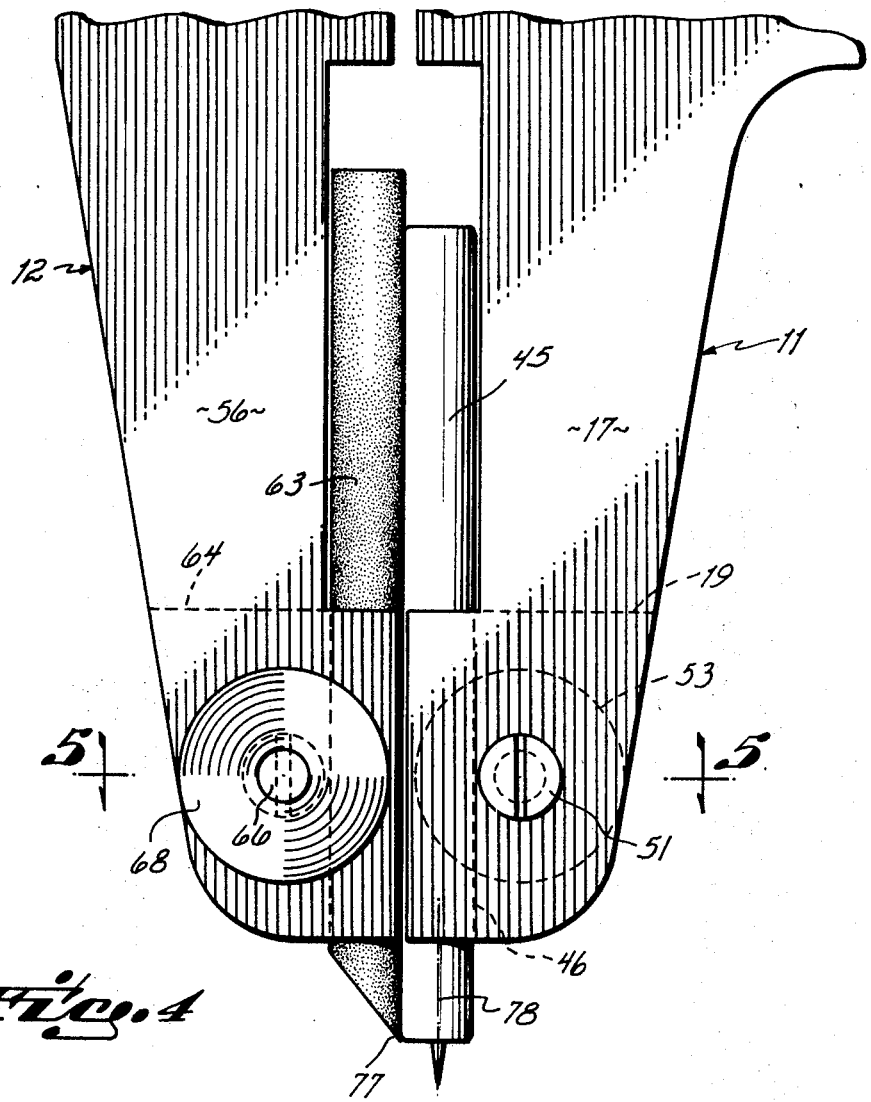

This invention relates to measuring, drafting and layout instruments and particularly to instruments which are adapted for rapidly and efficiently drawing circles or arcs of circles of accurately predetermined size. Throughout this application, I will refer to this compass as a drawing or drafting instrument although it will be understood by those persons skilled in this art that the instrument is readily adaptable to other uses with other tools to accomplish differing functions. For example, the marking end of the tool may be fitted with a lead point as illustrated and described herein or with an ink pen, divider point, carbide point, or a knife.

At the present time, two different distinct types or styles of compasses for drawing circles or arcs of circles are available on the commercial market. One type is the very inexpensive and inaccurate instrument which uses a conventional wooden lead pencil as the marking tool. The other type is that which is found in every set of drafting instruments and usually consists of a "drop" compass for drawing very small circles, a "bow" compass for drawing slightly larger circles, and a "friction locking" compass for drifting still larger circles. This latter type or style is suitable for drafting and layout work while the former is generally only suitable for use by children to draw circles of undefined dimensions.

There has been a long standing need for a drafting instrument which is located between these two extremes in terms of both cost and utility. Such an instrument is particularly needed for use by students in high school or college drafting classes whose funds are limited but who now have no choice but to purchase a very expensive set of drafting instruments which includes several compasses for varying applications. Other users who have need of such an instrument are students or professionals in engineering design, commercial art or creative sketch work.

It has therefore been a primary objective of this invention to provide an inexpensive compass to replace or supplant a conventional set of drawing instruments of the type which usually includes a "drop" compass for drawing very small circles, a "bow" compass for drawing slightly larger circles, and a "friction locking" compas for drafting circles of a still larger radius.

Another important objective of this invention has been to provide a single drafting instrument to replace these three different types of compasses which is easy to use, lightweight, and at least as accurate in drafting circles of a predetermined size as each of the three conventional compasses mentioned hereinabove.

Yet another objective of this invention has been to provide a compass which meets these other objectives and which is quickly and accurately set to a desired dimension without the use of an auxiliary scale.

Generally, the slide compass which accomplishes these objectives comprises two principal parts, each one of which is made from a sheet metal stamping. One of these principal parts is a combination slide bar and marking foot and the other is a body from which a flat needle foot extends downwardly and a rotation post extends upwardly. The body has a pair of parallel slots therein between which the metal is deformed rearwardly and outside of which the metal is bent forwardly so that a transverse slot is defined between these forwardly and rearwardly bent sections. The slide bar is laterally movable within this slideway.

A curvilinear leaf spring is mounted within a recess in the rearwardly bent section of the body. This spring engages the rear surface of the slide bar and forces the bar forwardly against the forwardly deflected sections of the body and thus functions to hold the slide bar in an adjusted position.

An indicia bearing strip of material is mounted within a recess in the front face of the slide bar. To facilitate reading the indicia on this scale, a lens having a vertical hairline defined therein is adjustable secured to the front face of the body. The adjustable mounting of the lens to the body permits the hairline to be accurately positioned relative to the scale.

The primary advantage of the above described construction is that it enables the major components of the compass to be stamped from sheet metal so that the compass, while it is a very accurate instrument, may be produced relatively inexpensively.

Another advantage of this compass is the ease with which it may be quickly and accurately set to a desired dimension. Because the scale is attached directly to the slide bar, it has its own sliding scale to facilitate quick and accurate adjustments. The leaf spring then frictionally holds the setting.

Because the index line is located on a laterally adjustable magnifying viewer, the instrument can be very precisely calibrated and thereafter, the slide may be very accurately set by reading the scale through the magnifying viewer or lens.

Another important advantage of this slide compass is attributable to the ease with which it enables circles or arcs of circles to be drawn. Because it is a slide type of compass, the body may be held almost perpendicular and the handle merely twirled to scribe a circle. This is opposed to the combined twirling and orbital movement required to effect drawing of a circle or arc with a conventional bow type of compass. With this compass, downward pressure on the handle or central rotation post seats the needle more firmly in the paper while side pressure on the handle in the direction of rotation increases the density of the scribed line. Because it is so easy to use and because it is so easy to vary the density of the scribed line, it is much easier to use and easier to learn to use than conventional drafting tools.

Figure 5:
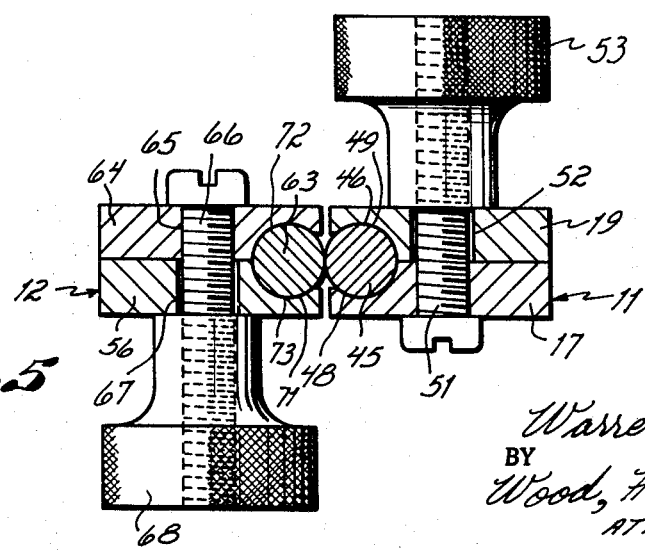

These and other objects and advantages of this invention will be more readily apparent from the following description of the drawings in which:

FIG. 1 is a front elevational view of a slide compass incorporating the invention of this application, FIG. 2 is a rear elevational view of the compass, FIG. 3 is an exploded perspective view of the compass, FIG. 4 is an enlarged front elevational view of the needle foot and lead foot of the compass illustrating the position of the needle and lead during the initial index setting of the hairline of the compass, FIG. 5 is a cross-sectional view taken along line 5—5 of FIG. 4, FIG. 6 is a cross-sectional view taken along line 6—6 of FIG. 1, FIG. 7 is a cross-sectional view taken on line 7—7 of FIG. 1, FIG. 8 is a cross-sectional view taken on line 8—8 of FIG. 1, and FIG. 9 is a perspective view of a flat metal stamping from which the body of the compass is formed.

The principal components of the slide compass 10 of this invention are a body 11 and a slide 12. Both of these components 11 and 12 are made from sheet metal stampings which facilitate a relatively inexpensive construction.

The metal stamping 13 (FIG. 9) from which body 11 is formed comprises a generally rectangular central section 15 having a flat rotation post 16 extending upwardly and a needle foot 17 extending downwardly. The body assembly 11 is completed by a knurled cap 18, a needle clamp plate 19, a lens 20, and a friction locking spring 21.

As may be seen most clearly in FIG. 9, the central section 15 of the body 11 has a pair of parallel vertical slots 23, 24 stamped therefrom. It also has a rectangular recess 25 formed in the front face between the two vertical slots 23, 24. Three apertures, 26, 27 and 28, which are subsequently threaded, are punched from the stamping 13. Additionally, the central section of the stamping 13 is formed with sawtooth upper and lower edges 29 and 30. The purpose of these sawtooth or knurled edges is to provide a secure grip for the righthand on the body during adjustment of the slide to a setting.

After the body 13 is stamped from a flat metal sheet, it is formed by offsetting the portion 34 of the body located between the two slots 23, 24 rearwardly from the vertical plane of the stamping as may be seen most clearly in FIGS. 7 and 8. The portions 35, 36 of the central section 22 of the body located outside the two slots 23, 24 are offset forwardly by the same amount that the central portion is offset rearwardly so that the two offset sections define a rectangular cross section transverse slot 38 therebetween. This slot is most clearly evident in FIGS. 3, 7 and 8.

To facilitate rotation of the body, the cap 18 surmounts the upper end of the rotation post 16. This cap 18 has a recess 39 drilled in its bottom end wall so that the cap 18 may be press fit onto the upper end 40 of the post 16.

A needle 45 is mounted in the bottom of the needle foot 17. This needle is supported within an arcuate recess 46, one half 48 of which is stamped into the lower end of the needle foot 17 and the other half 49 of which is stamped into the flat clamping plate 19. The clamping plate 19 is secured onto the lower end of the needle foot 17 by a screw 51 which is threaded through the aperture 28 in the foot 17. This screw 51 passes through an unthreaded aperture 52 in the clamping plate 19 and has a thumb nut 53 threaded thereon. The diameter of the arcuate recess 46 is slightly greater than the diameter of of the needle 45 so that the needle may be clamped in an adjusted position between the plate 19 and the leg 17 when the nut 53 is tightened onto the screw 51. In the preferred embodiment, the diameter of the needle 45 is, for example, 1/16 of an inch so that the compass may be used to scribe a circle or an arc as small as 1/32 of an inch in radius, as explained more fully hereinafter.

The body asembly is completed by securing the magnifying lens 20 to the front face of the central section 15 of the body. As may be seen most clearly in FIG. 3, this lens 20 is generally rectangular when viewed in front elevation. The central section of the lens is semi-cylindrical and has the convex face 54 extending forwardly so that it functions as a magnifying glass. The lens 20 is preferably made from an acrylic or other transparent plastic material.

The slide assembly 12 of the compass consists of a slide bar 55 from which a lead foot 56 depends. The slide bar 55 has a shallow longitudinal recess 57 formed therein as may be seen most clearly in FIG. 3. A scale 58 made from a metallized Mylar strip of flexible material having indicia 59 demarked thereon is adhesively secured within this recess 57 such that the front face of the Mylar strip is located in a plane slightly below the plane of the front face of the slide bar 55. In a preferred embodiment, the front face of the Mylar insert is located .001" below the surface of the slide bar so that the indicia never contacts and is marred by contact with the body. Indicia 59 on the scale may be demarked in fractions of an inch, decimal fractions, or in the metric system or even in some scale for a specialized use as, for example, in fractions of a nautical mile.

A marking tool such as a pencil lead 63 is mounted on the lower end of the marking foot 56 of the slide 12. The lead is clamped in the foot by a clamping plate 64. This plate 64 has a threaded aperture 65 therein through which a screw 66 is threaded. This screw 66 passes through an unthreaded aperture 67 in the bottom of the foot 56 and has a thumb nut 68 threaded thereon. Tightening of the nut 68 clamps the plate 64 onto the lower end of the leg 56.

Both the lower end of the leg 56 and the clamping plate 64 have co-extensive arcuate recesses 71, 72 therein which together define an arcuate recess 73 of approximately 300°. The pencil lead 63 is mounted within the vertical recess or aperture 73 formed between the clamping plate 64 and the leg 56. The diameter of the recess formed between the plate 64 and the leg 56 should be slightly greater than a standard compass drawing lead so that tightening of the thumb nut 68 results in clamping of the lead 63 in an adjusted position between the clamping plate and the leg.

To hold the slide bar 55 in an adjusted position within the transverse slot 38 in the body, the generally rectangular leaf spring 21 is mounted within the recess 25 of the body. As may be seen most clearly in FIG. 6, this leaf spring 21 which is preferably made from a Phosphor bronze material, is bent into a curvilinear configuration and is slightly shorter than the recess within which it is mounted. In the small sizes and thickness of Phosphor bronze used in the spring 21, it would never bend in the center 74 if both longitudinal ends engaged and were blocked by the ends of the recess 25. As shown in FIG. 6, its projected longitudinal dimension increases a few thousandths when the slide is inserted into the body and causes the spring 21 to unbend slightly giving the desired frictional force between the spring and the slide bar 55.

The spring 21 is not perfectly rectangular but is wider at one slotted end than at the other end. The slotted end is slightly wider than the recess 25 in the body so the spring 21 must be snapped into place with finger pressure. The two slots allow some lateral deflection of the fingers 69 and 70. This snap fit on one end of the spring 21 in no way detracts from the flexing of the main body of the spring since all other edges of it are clear of the body recess 25 walls. Thus captivated, it never falls out when the slide is completely withdrawn. In fact, it is so well retained that it cannot be made to come out without actually poking it out with some pointed object.

Before using the compass, a vertical hairline 75 demarked on the rear surface of the magnifying lens 20 must first be accurately positioned over an index mark 76 on the scale 58. This is accomplished by moving the vertical edge of the pencil lead 63 into contact with the vertical edge of the needle 45 as shown in FIGS. 4 and 5. The marking point 77 of the lead 63 is then located in contact with the edge of the needle 45 and is then spaced from the centerline 78 of the needle a distance exactly equal to the radius of the needle 45. The index mark 76 on the scale 58 is set for this same dimension, i.e., the radius of the needle 45. By precisely positioning the hairline 75 of the lens over the index mark 76 on the scale 58 with the pencil lead and needle in this position, the compass will be accurately set so that it may thereafter be used to draw circles as accurate as the demarcations or indicia 59 on the scale 58.

To facilitate accurate positioning of the lens 20 relative to the index mark 76, the lens is secured to the body 11 by small screws 82 which pass through transverse slots 84, 85 in the lens and are threaded into the threaded apertures 26, 27. Thus, by loosening the screws 82, the lens may be accurately set relative to the scale 58 by the procedure described hereinabove.

Numerous advantages accrue from this construction of the compass 10. Specifically, this construction provides a compass which is very quickly set to an accurate dimension. All that is required is to locate the hairline 75 over a mark 59 on the scale 58 which denotes the radius of the circle to be drawn. The magnification provided by the lens permits this to be done quickly with a minimum of eyestrain. Thereafter, the leaf spring 21 holds the slide in this accurately adjusted position.

Because the two major components, the body and the slide, and three of the minor components, the two clamp plates 19, 64 and the spring 21, of the compass are all made from sheet metal stampings, they are inexpensive to produce and yet may be made to very accurate tolerances. The fact that both the lead and needle are clamped by punch press parts on both sides, and are held by screw machine parts, means that there is no hand labor involved in the fabrication of these assemblies. These stampings may be made from a noncorrosive material such as stainless steel or, as in one preferred embodiment, may be stamped from sheet steel and then subsequently chrome plated.

While only a single preferred embodiment of my invention has been illustrated and described herein, those persons skilled in the arts to which this invention pertains will readily appreciate numerous changes and modifications which may be made without departing from the spirit of my invention. Specifically, other materials such as dimensionally stable molded plastic could be used in lieu of steel to form the components of the compass. Therefore, I do not intend to be limited except by the scope of the appended claims.

Having described my invention, I claim:

1. A slide compass of the type used to scribe an arc of a circle by rotating a post of the compass between the thumb and the first finger of a person's hand, which compass comprises two principal parts, one of said principal parts being a unitary slide and the other principal part being a unitary body, said unitary slide comprising a transverse slide bar having a marking foot depending from one end thereof, a scale having indicia thereon on the front of said slide bar, said unitary body comprising a generally flat central section from which a needle foot depends downwardly and a rotation post extends upwardly, said rotation post being generally vertically aligned with said needle foot, a marking element having an axis located on a vertical plane mounted upon said marking foot and a needle having an axis located in a vertical plane mounted upon said needle foot, said marking element and said needle being so mounted upon said marking foot and needle foot respectively that they are movable into vertical edgewise contacting relationship, a transverse slideway perpendicular to both of said axes extending through said central section of said body, said slide bar extending through said slideway and being slideable therein, and a transparent viewing lens attached to the front face of said body and extending over said transverse slideway, said viewing lens having a vertical index hairline defined therein and means for securing said lens to said body, said compass lens being adjustably secured to said body and movable horizontally relative thereto, said scale having an index mark thereon spaced a predetermined distance from a zero reference position on said scale which predetermined distance is the same as the radius of said needle so that said compass may be precisely calibrated by placing said marking element in said edgewise contacting relationship to said needle and adjusting said index hairline so as to precisely locate it over said index mark.

2. The slide bar of claim 1 which further includes a spring mounted within said central section of said body and engaged with said slide bar to hold said slide bar in an adjusted position in said slideway.

3. The slide compass of claim 2 wherein said spring comprises a curvilinear leaf spring mounted with a recess of said body, said spring having an arcuate center section contacting said slide bar and end sections located in said recess.

4. The slide compass of claim 1 in which said central section of said body has a pair of transversely spaced vertical slots therein, a first transverse portion of said central section between said slots being located in a different vertical plane from a second transverse portion of said central section which is located transversely outwardly from said slots so that said portions together define a transverse slideway through said central section of said body.

5. The slide compass of claim 4 which further includes a first clamping plate for securing said marking element upon said marking foot and a second clamping plate for securing said needle upon said needle foot, both of said clamping plates being formed from sheet metal stampings and having one half of a needle clamping surface and one half of a marking element clamping surface demarked thereon, the other half of the needle and marking element clamping surfaces being demarked on the needle foot and the marking foot respectively.

6. The slide compass of claim 1 wherein said lens is convex so as to magnify said scale when viewed through said lens.

7. A slide compass which comprises two principal parts, one of said principal parts being a slide and the other principal part being a body, said slide comprising a transverse slide bar having a marking foot depending from one end thereof, a generally rectangular scale having indicia thereon embedded in a recess in the front of said slide bar, said scale having the front surface in a common plane with the front surface of said slide bar, said body comprising a generally flat central section from which a needle foot depends downwardly and a rotation post extends upwardly, a marking element mounted upon said marking foot and a needle mounted upon said needle foot, a transverse slideway through said central section of said body, said slide bar extending through said slideway and being slideable therein, a first clamping plate for securing said marking element upon said marking foot and a second clamping plate for securing said needle upon said needle foot, said central section of said body being generally rectangular in configuration, said needle foot and said rotation post being located in a common vertical plane on one side of said central section of said body, said one side of said central section being in juxtaposition to said flat marking foot so that the second side of said central section opposite said one side serves to counterbalance said compass about the centerline of said rotation post.

References Cited

UNITED STATES PATENTS

| | | |
|---|---|---|
| 47,421 | 4/1865 | Hubner. |
| 295,076 | 3/1884 | Svenson _____ 33—158 |
| 314,316 | 3/1885 | Christian _____ 33—158 X |
| 673,687 | 5/1901 | Penfield. |
| 1,404,794 | 1/1922 | Reitenbaugh. |
| 1,461,421 | 7/1923 | Hood. |
| 2,087,600 | 7/1937 | Knoblauch. |
| 2,305,376 | 12/1942 | Blum. |
| 2,324,041 | 7/1943 | Suverkrop. |
| 2,499,673 | 3/1950 | Olejniczak _____ 33—158 |
| 2,832,141 | 4/1958 | Taylor. |
| 2,563,400 | 8/1951 | Duduit. |
| 2,799,942 | 7/1957 | Ehler. |
| 3,088,208 | 5/1963 | Mitchell _____ 33—173 X |
| 2,867,042 | 1/1959 | Sutton _____ 33—158 |
| 3,000,102 | 9/1961 | Snyder. |
| 3,156,981 | 11/1964 | Sutton _____ 33—158 X |
| 3,264,736 | 8/1966 | Novak. |
| 3,315,363 | 4/1967 | Shiffman. |

FOREIGN PATENTS

| | | |
|---|---|---|
| 86,867 | 2/1959 | Denmark. |
| 524,377 | 5/1921 | France. |
| 1,322,027 | 2/1963 | France. |
| 411,009 | 7/1945 | Italy. |

HARRY N. HAROIAN, Primary Examiner

UNITED STATES PATENT OFFICE
CERTIFICATE OF CORRECTION

Patent No. 3,524,258          Dated August 18, 1970

Inventor(s) W. D. Novak

It is certified that error appears in the above-identified patent and that said Letters Patent are hereby corrected as shown below:

Claim 3, line 28, please change the word "with" to read -- within -- .

NOV. 3, 1970

(SEAL)
Attest:

Edward M. Fletcher, Jr.
Attesting Officer

WILLIAM E. SCHUYLER, JR.
Commissioner of Patents